INVENTOR.
JOHN R. SCANTLIN
BY HIS ATTORNEYS
HARRIS, KIECH, RUSSELL & KERN

INVENTOR.
JOHN R. SCANTLIN
BY HIS ATTORNEYS
HARRIS, KIECH, RUSSELL & KERN

United States Patent Office 3,160,812
Patented Dec. 8, 1964

3,160,812
COMPOSITE TRANSMISSION SYSTEM UTILIZING PHASE SHIFT AND AMPLITUDE MODULATION

John R. Scantlin, Los Angeles, Calif., assignor to Scantlin Electronics, Inc., Los Angeles, Calif., a corporation of Delaware Filed Nov. 9, 1961, Ser. No. 151,261
14 Claims. (Cl. 325—30)

This invention relates to information transmission systems and, in particular, to systems for handling more than one input information source on a single carrier. The system of the invention is primarily intended for use with existing radio transmission channels to provide for additional data transmission facilities but, of course, is equally suitable for use with new installations.

It is an object of the invention to provide an information transmission system for use with a conventional amplitude modulation radio channel such as a commercial broadcasting station to provide for transmission of data in binary form concurrent with the audio frequency signal without disturbing the audio frequency signal in any way. A further object is to provide such a system in which the additional data transmission is obtained by use of very small shifts in phase of the carrier which phase shifts have no effect on the audio frequency signal.

It is an object of the invention to provide a transmisison system for handling audio frequency information and digital information in binary form, with the receiver reproducing the binary information together with a synchronization pulse train without requiring a separate time base generator at the receiver. A further object is to provide such a system in which the binary information is transmitted by means of a small phase shifts in the carrier. A further object is to provide such a system in which the receiver includes a phase shift detector in the form of a crystal operating between its series resonance and antiresonance points.

It is a particular object of the invention to provide a transmission system in which the input information is converted from a standard binary code or other form into a pulse code having a zero average value permitting operation of the phase shift detector without a D.C. reference and without a closely controlled intermediate frequency.

It is an object of the invention to provide an information transmission system for use with an amplitude modulation radio transmitter including a carrier frequency oscillator, means for varying the phase of the oscillator output as a function of input information in binary form to produce a phase shifted carrier with a phase variation in the range of plus and minus 180°, with a positive change or shift corresponding to one binary state and a negative change or shift corresponding to the other binary state, modulator means for amplitude modulating the phase shifted carrier as a function of an audio frequency signal to produce a radio signal for transmission by the transmitter, and a radio receiver for receiving the transmitted radio signal and including detector means for detecting the phase variation of the carrier to produce an audio frequency signal varying in amplitude as a function of carrier phase, with the audio frequency signal corersponding to the binary input information.

It is also an object of the invention to provide a method of transmitting binary information and audio frequency information on a single carrier including the steps of generating a radio frequency carrier, varying the phase of the carrier within the range of plus and minus 180° as a function of the binary information, with a positive shift corresponding to one binary state and a negative shift corresponding to the other binary state, amplitude modulating the carrier as a function of the audio frequency information, and radiating the shifted modulated carrier. A further object is to provide such a method including the step of converting standard binary information to a pulse code in binary form having a zero average value. Further objects include the steps of receiving the radiated carrier, detecting the phase shift of the carrier producing an audio frequency signal corresponding to the binary information, and also amplitude demodulating the received carrier producing an audio frequency signal corresponding to the audio frequency input.

The invention also comprises novel details of construction and novel combinations and arrangements of parts, which will more fully appear in the course of the following description. The drawings merely show and the description merely describes a preferred embodiment of the present invention which is given by way of illustration or example.

Figure 1:
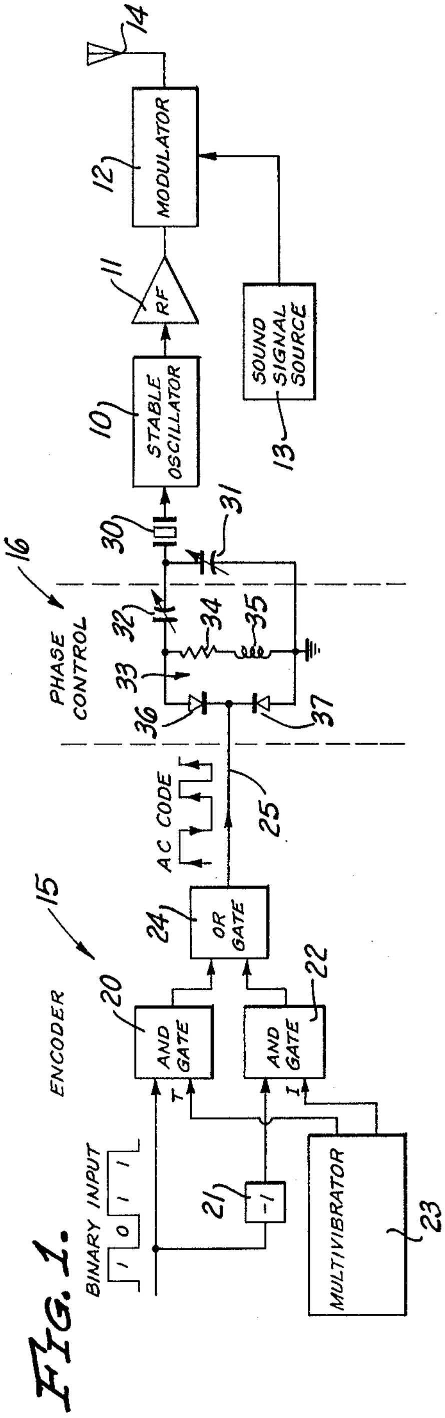
FIG. 1 is a diagram of a transmitter for handling a binary information input and an audio or sound signal input on a single carrier.

The transmitter of FIG. 1 includes a stable oscillator 10 for generating the carrier, a radio frequency amplifier 11, an amplitude modulation modulator 12, a source of sound or audio frequency signals 13 coupled to the modulator 12, and an antenna system 14. These are the conventional components of an amplitude modulated transmitter and may be found in any commercial broadcasting station.

The transmitter of FIG. 1 also includes an encoder 15 for converting the input data to a code suitable for use with the transmitter, and a phase control unit 16 for shifting the phase of the carrier.

The information to be transmitted by shifting phase of the carrier may initially have any form, but is converted to binary form prior to transmission. The phase of the carrier is shifted a very small amount, ordinarily in the range of plus and minus 180° or less with a positive change or shift corresponding to one level and hence one state of the code and a negative change or shift corresponding to the other level and other state of the code. It is preferred to operate the system with a pulse code in binary form having a zero average value and this pulse code is identified herein as the A.C. code, indicating that it has no D.C. component. The encoder 15 of FIG. 1 illustrates a preferred form of circuit for converting a standard binary code to the A.C. code.

The binary input is connected directly to an AND gate 20 and through an inverter 21 to a second AND gate 22. A typical binary coded signal is shown in the first line of FIG. 2 and the output of the inverter 21 corresponding to this signal is shown in line 2. A multivibrator 23 or other source of timed pulses is operated at the clock frequency or information rate of the binary input with the true multivibrator output connected to the AND gate 20 and the inverted multivibrator output connected to the AND gate 22. The multivibrator wave forms are shown at lines 3 and 4 of FIG. 2.

Figure 2:
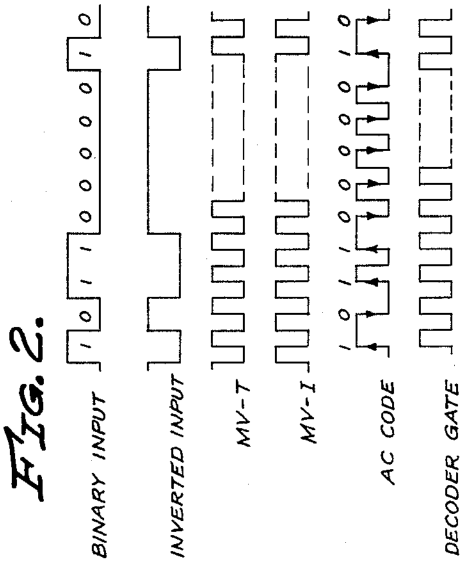
FIG. 2 is a timing diagram of the operation of the system.

The AND gates 20, 22 are connected to an OR gate 24 which provides an output on line 25 for driving the phase control unit 16. The output of the OR gate is the A.C. code corresponding to the binary input. The A.C. code equivalent to the binary input of line 1 of FIG. 2 is shown on line 5 of FIG. 2.

For the system illustrated herein, a binary ONE is encoded as a positive change in the A.C. code and a binary ZERO is encoded as a negative change in the A.C. code. (The phasing may be reversed, but this convention is followed in the discussion herein.) If two consecutive binary ONES are to be sent, a negative change must be introduced between the two positive changes so that the second positive change is possible. These intermediate changes are introduced by means of the multivibrator and gates of the encoder. In the diagram of FIG. 2, the changes which correspond to the binary bits are indicated by arrows while the intermediate changes which do not carry information corresponding to the input have no arrows. It is seen that the frequency of transitions when sending all ONES or all ZEROS is double the bit rate of the binary input while the transition frequency for alternate ONES and ZEROS is equal to the bit rate.

Various means for varying the phase of the carrier may be utilized. In the circuit of FIG. 1, the carrier frequency is controlled by a crystal 30 connected in series with a variable capacitor 31 which provides for precise adjustment of the carrier frequency. The capacitor 31 is shunted by the phase control unit which may comprise a variable capacitor 32 connected in series with a parallel combination 33. One branch of the parallel combination includes a resistor 34 and an inductance 35. The other branch includes diodes 36, 37 connected in opposite polarities. The conductor 25 with the A.C. code is connected to the junction point of the diodes. The phase control unit and the frequency determining elements of the oscillator are preferably enclosed in a temperature-controlled oven for precise control of the carrier frequency.

The diodes 36, 37 may be silicon diodes which function as voltage sensitive capacitors for changing the capacitance shunting the capacitor 31 as a function of the voltage appearing on the line 25. The change in shunt capacitance produces a phase shift in the carrier with the phase shifting in one direction when the A.C. code voltage goes positive and shifting in the other direction when the code voltage goes negative. The capacitor 32 provides for adjustment of the magnitude of phase shift. The resistor 34 provides a D.C. return for the diodes through the inductance 35 which provides improved phase-shift linearity.

The phase of the transmitter carrier is advanced and retarded as a function of the A.C. code with the overall phase shift being very small and within the range of plus and minus 180°. The shifted carrier is then amplitude modulated in the conventional manner by the sound signal source which may be an ordinary audio frequency voice or music signal.

Figure 4:
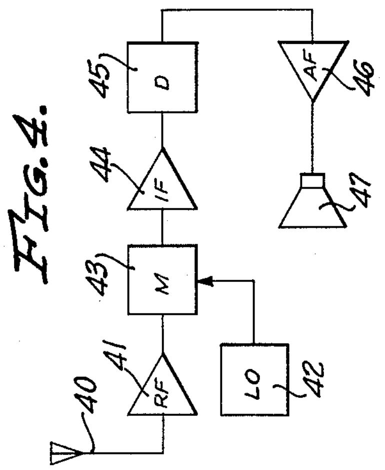
FIG. 4 is a diagram of a receiver for extracting the audio or sound signal from the transmitted signal.

FIG. 4 illustrates a typical amplitude modulation receiver which includes an antenna 40, a radio frequency amplifier 41, a local oscillator 42, a mixer 43, an intermediate frequency amplifier 44, a detector 45, an audio frequency amplifier 46, and a speaker 47.

The shifted modulated carrier from the transmitter of FIG. 1 may be received by the receiver of FIG. 4. The audio frequency signal produced at the speaker 47 will correspond to the audio signal of the source 13. The phase variations in the carrier corresponding to the binary input information will not be detected in the amplitude modulation receiver and have no effect on its output.

Figure 3:
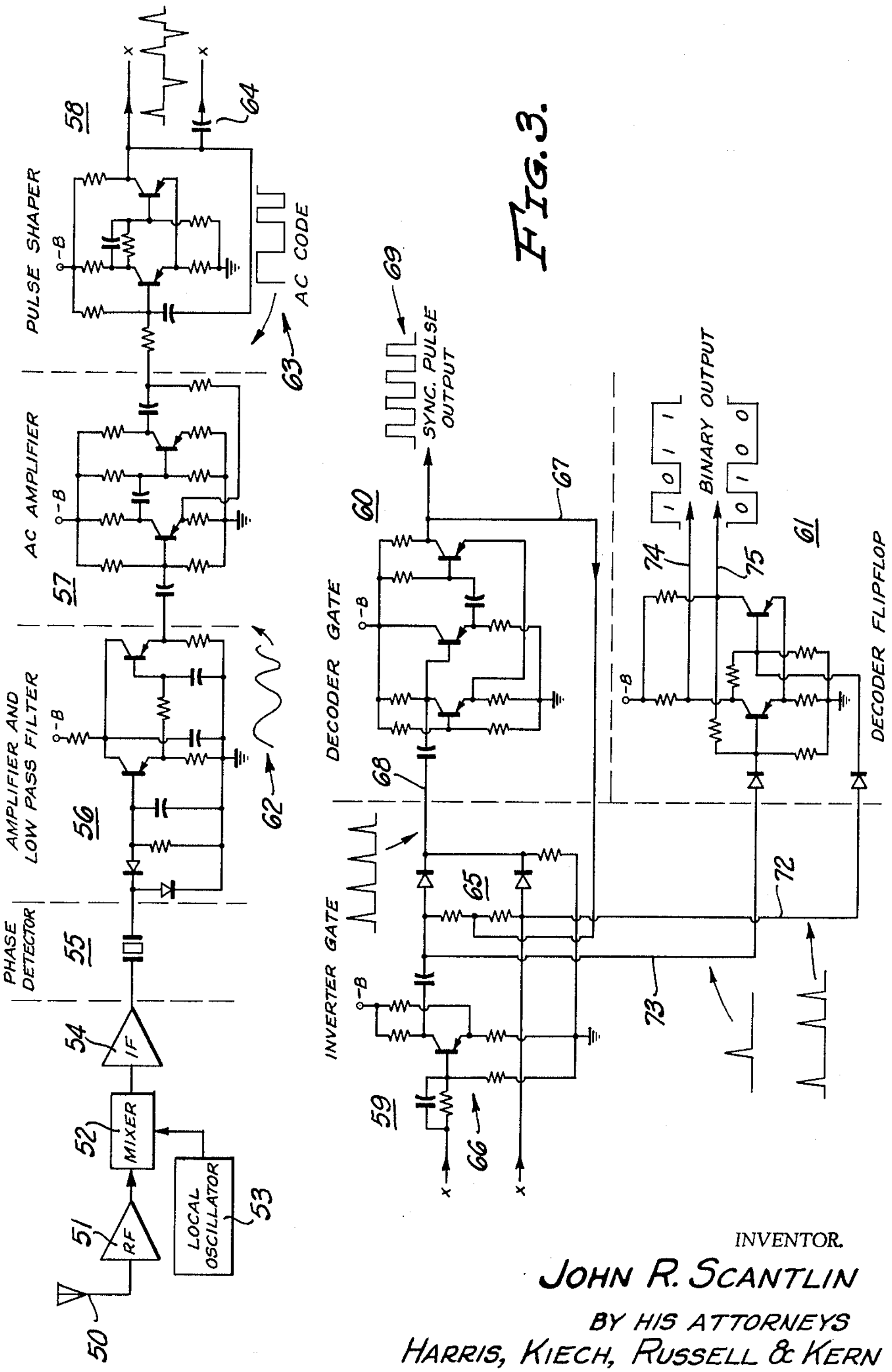
FIG. 3 is a diagram of a receiver for extracting the binary information from the transmitted signal.

A receiver for the binary information is shown in FIG. 3 and includes an antenna 50, a radio frequency amplifier 51, a mixer 52, a local oscillator 53, an intermediate frequency amplifier 54, a phase detector 55, an amplifier and low pass filter 56, an A.C. amplifier 57, a pulse shaper 58, an inverter gate 59, a decoder gate 60, and a decoder flip-flop 61.

The radio and intermediate frequency amplifiers, the mixer and the local oscillator may be conventional in design and operation. The phase detector may be a piezoelectric crystal, such as a quartz crystal, preferably operated between its series resonance and anti-resonance frequencies. The output from the phase shift detector crystal is connected to the low pass filter and amplifier 56 to produce an audio frequency signal as indicated at 62 which corresponds to the A.C. code used to drive the phase control unit.

The signal is amplified and clipped in the A.C. amplifier 57 resulting in an output substantially identical to the input A.C. code as shown at 63. The pulse shaper 58 is a circuit of the Schmidt trigger type which produces an output pulse for each change in level of the A.C. code. The output of the pulse shaper 58 is connected through a capacitor 64 to the diode OR gate 65 and also through an inverter 66 to the gate 65.

Ordinarily the output of the inverter gate would include a positive pulse for each change of the A.C. code. However, the non-information carrying pulses corresponding to the non-information carrying changes in the code are blocked from the inverter gate output by a signal fed back from the decoder gate 60 on the line 67. The decoder gate 60 is a one-shot multivibrator triggered by the output 68 of the inverter gate. The one-shot multivibrator has a delay built in so that it cannot be fired in less than one half of a clock cycle after a preceding firing. Hence the decoder gate will not follow the double clock frequency pulses which occur when a series of ONES or a series of ZEROS are being transmitted but will follow pulses corresponding to alternate ONES and ZEROS which pulses occur at the clock rate of the binary input.

The decoder gate output indicated at 69 and at the bottom line of FIG. 2 provides a synchronizing pulse train which pulse train is exactly in synchronism with the clock rate of the binary input to the encoder. The output of the decoder gate operating through the line 67 blocks the output of the inverter gate for a period greater than one-half a clock cycle after a decoder gate pulse thereby blocking the non-information carrying pulses from the output of the receiver.

The pulse train appearing on the line 72 corresponds to the binary input with each pulse being a ONE. Similarly, the pulse train on the line 73 corresponds to the binary input with each pulse being a ZERO. The signals on the lines 72, 73 are used to trigger the decoder flip-flop 61 to produce the binary output on line 74 equivalent to the binary input and the inverse of the binary input on line 75.

The transmission system of the invention has a number of unique features and advantages. Binary data may be transmitted on a conventional broadcasting station without affecting the audio frequency signal being transmitted thereby. The binary information is produced at the receiver together with a synchronizing pulse train thereby eliminating any requirements for a time base generator at the receiver . The system utilizes a pulse code having no D.C. component hence there is no requirement that a D.C. level be maintained in the receiver. This materially reduces the frequency stability requirements of the intermediate frequency and phase shift detector, premitting conventional crystals to be used in the local oscillator and in the detector. The intermediate frequency may drift up and down over wide values between the series resonance and anti-resonance frequencies of the phase detector crystal without affecting the operation of the system. The crsytal will also function as a phase shift detector, though not as efficiently, when the intermediate frequency is near the series resonance point but on the side away from the anti-resonance value.

The system of the present invention may be added to an existing transmitter without requiring shutdown of the transmitter and without requiring any modification of the transmitter. This may be accomplished by connecting the output of the oscillator 10 to the existing transmitter oscillator in controlling relation, as by coupling in parallel with the existing crystal and the transmitter operation continues unimpaired.

Of course, various means of introducing phase shift into the transmitter carrier can be utilized. In addition to shifting the phase of the oscillator itself, the oscillator may be operated with zero phase shift and the phase variation introduced into the carrier prior to modulation.

While the preferred form of the system incorporates separate receivers for the binary data and the audio frequency signal, it should be noted that a single antenna, radio frequency amplifier, mixer and intermediate frequency amplifier could be used if desired.

In a typical apparatus incorporating the system of the invention, the binary information is handled at a rate of sixty input bits per second with a phase shift of 60° for an input consisting of alternate ONES and ZEROS, and a phase shift of 120° for an input consisting of consecutive ONES or ZEROS.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In an information transmission system for use with an amplitude modulation radio transmitter, the combination of:

a carrier frequency oscillator;

means for varying the phase of the oscillator output as a function of input information in binary form to produce a phase shifted carrier with a phase variation within the range of plus and minus 180°, with a positive shift corresponding to one binary state and a negative shift corresponding to the other binary state;

modulator means for amplitude modulating the phase shifted carrier as a function of a variable audio frequency signal to produce a radio signal for transmission by the transmitter;

and a radio receiver for receiving the transmitted radio signal and including detector means for detecting the phase variation of the carrier to produce an audio frequency signal varying in amplitude as a function of carrier phase, said audio frequency signal corresponding to said binary input information.

2. In an information transmission system for use with an amplitude modulation radio transmitter, the combination of:

a carrier frequency oscillator;

means for varying the phase of the oscillator output as a function of input information in binary form to produce a phase shifted carrier with a phase variation within the range of plus and minus 180°, with a positive shift corresponding to one binary state and a negative shift corresponding to the other binary state;

modulator means for amplitude modulating the phase shifted carrier as a function of a variable audio frequency signal to produce a radio signal for transmission by the transmitter;

and a radio receiver for receiving the transmitted radio signal and including a crystal detector for detecting the phase variation of the carrier to produce an audio frequency signal varying in amplitude as a function of carrier phase, with the nominal detector operating frequency between the crystal series resonance and anti-resonance frequencies, said audio frequency signal correpsonding to said binary input information.

3. In an information transmission system for use with an amplitude modulation radio transmitter, the combination of:

a carrier frequency oscillator;

converter means for converting input information into a pulse code having a zero average value wherein the positive going changes at timed intervals represent one binary state and the negative going changes at the timed intervals represent the other binary state;

means for varying the phase of the oscillator output as a function of the pulse code to produce a phase shifted carrier with a phase variation within the range of plus and minus 180°, with a positive shift corresponding to one pulse level and a negative shift corresponding to the other pulse level;

modulator means for amplitude modulating the phase shifted carrier as a function of a variable audio frequency signal to produce a radio signal for transmission by the transmitter;

a radio receiver for receiving the transmitted radio signal and including detector means for detecting the phase variation of the carrier to produce an audio frequency signal varying in amplitude as a function of carrier phase, said audio frequency signal corresponding to said pulse code;

and decoder means for reconverting the audio frequency signal from the pulse code to the original input information.

4. In an information transmission system for use with an amplitude modulation radio transmitter, the combination of:

a carrier frequency oscillator;

converter means for converting input information into a pulse code having a zero average value wherein the positive going changes at timed intervals represent one binary state and the negative going changes at the timed intervals represent the other binary state;

means for varying the phase of the oscillator output as a function of the pulse code to produce a phase shifted carrier with a phase variation within the range of plus and minus 180°, with a positive shift corresponding to one pulse level and a negative shift corresponding to the other pulse level;

modulator means for amplitude modulating the phase shifted carrier as a function of a variable audio frequency signal to produce a radio signal for transmission by the transmitter;

a radio receiver for receiving the transmitted radio signal and including a crystal detector for detecting the phase variation of the carrier to produce an audio frequency signal varying in amplitude as a function of carrier phase, with the crystal operating between its series resonance and anti-resonance frequencies, said audio frequency signal corresponding to said pulse code;

and decoder means for reconverting the audio frequency signal from the pulse code to the original input information.

5. In an information transmission system for use with an amplitude modulation radio transmitter, the combination of:

a carrier frequency oscillator;

a source of input information in binary code form;

a synchronization pulse source for producing a first pulse train at the clock frequency of the binary code and a second pulse train which is the inverse of the first pulse train;

an inverter for producing an output which is the inverse of the input thereto, with said input source connected to said inverter;

a pair of AND gates, with one AND gate having the input binary code and said first pulse train as inputs and with the other AND gate having the inverter output and the second pulse train as inputs;

an OR gate having the AND gate outputs as inputs, the OR gate output comprising a pulse code having a zero average value wherein the positive going changes at clock pulse intervals represent one binary state and the negative going changes at clock pulse intervals represent the other binary state;

means for varying the phase of the oscillator output as a function of the pulse code to produce a phase shifted carrier with a phase variation in the range of plus and minus 180°, with a positive shift corresponding to one pulse level and a negative shift corresponding to the other pulse level;

modulator means for amplitude modulating the phase shifted carrier as a function of an audio frequency signal to produce a radio signal for transmission by the transmitter;

a radio receiver for receiving the transmitted radio signal and including detector means for detecting the phase variation of the carrier to produce an audio frequency signal varying in amplitude as a function of carrier phase, said audio frequency signal corresponding to said pulse code;

and decoder means for reconverting the audio frequency signal from the pulse code to the original binary code input information.

6. In an information transmission system for use with an amplitude modulation radio transmitter, the combination of:

a carrier frequency oscillator;

a source of input information in binary code form;

a synchronization pulse source for producing a first pulse train at the clock frequency of the binary code and a second pulse train which is the inverse of the first pulse train;

an inverter for producing an output which is the inverse of the input thereto, with said input source connected to said inverter;

a pair of AND gates, with one AND gate having the input binary code and said first pulse train as inputs and with the other AND gate having the inverter output and the second pulse train as inputs;

an OR gate having the AND gate outputs as inputs, the OR gate output comprising a pulse code having a zero average value wherein the positive going changes at clock pulse intervals represent one binary state and the negative going changes at clock pulse intervals represent the other binary state;

means for varying the phase of the oscillator output as a function of the pulse code to produce a phase shifted carrier with a phase variation in the range of plus and minus 180°, with a positive shift corresponding to one pulse level and a negative shift corresponding to the other pulse level;

modulator means for amplitude modulating the phase shifted carrier as a function of an audio frequency signal to produce a radio signal for transmission by the transmitter;

a radio receiver for receiving the transmitted radio signal and including detector means for detecting the phase variation of the carrier to produce an audio frequency signal varying in amplitude as a function of carrier phase, said audio frequency signal corresponding to said pulse code;

first trigger means for generating a pulse for each positive going change of said audio frequency signal;

second trigger means for generating a pulse for each negative going change of said audio frequency signal;

gate means for combining the outputs of said first and second trigger means, said gate means including a delay means for blocking a succeeding pulse until more than half a clock pulse interval lapses after the preceding pulse, to produce a pulse train corresponding to that of said synchrnoization pulse source;

and circuit means for coupling said gate means pulse train to said first and second trigger means in controlling relation for limiting operation thereof to changes occurring at the clock pulse rate, whereby the trigger means outputs correspond to the original binary code input information.

7. In an information transmission system for use with an amplitude modulation radio transmitter, the combination of:

a carrier frequency oscillator;

a source of input information in binary code form;

a synchronization pulse source for producing a first pulse train at the clock frequency of the binary code and a second pulse train which is the inverse of the first pulse train;

an inverter for producing an output which is the inverse of the input thereto, with said input source connected to said inverter;

a pair of AND gates, with one AND gate having the input binary code and said first pulse train as inputs and with the other AND gate having the inverter output and the second pulse train as inputs;

an OR gate having the AND gate outputs as inputs, the OR gate output comprising a pulse code having a zero average value wherein the positive going changes at clock pulse intervals represent one binary state and the negative going changes at clock pulse intervals represent the other binary state;

means for varying the phase of the oscillator output as a function of the pulse code to produce a phase shifted carrier with a phase variation in the range of plus and minus 180°, with a positive shift corresponding to one pulse level and a negative shift corresponding to the other pulse level;

modulator means for amplitude modulating the phase shifted carrier as a function of an audio frequency signal to produce a radio signal for transmission by the transmitter;

a radio receiver for receiving the transmitted radio signal and including a crystal detector for detecting the phase variation of the carrier to produce an audio frequency signal varying in amplitude as a function of carrier phase, with the crystal operating between its series resonance and anti-resonance frequencies, said audio frequency signal corresponding to said pulse code;

first trigger means for generating a pulse for each positive going change of said audio frequency signal;

second trigger means for generating a pulse for each negative going change of said audio frequency signal;

gate means for combining the outputs of said first and second trigger means, said gate means including a delay means for blocking a succeeding pulse until more than half a clock pulse interval lapses after the preceding pulse, to produce a pulse train corresponding to that of said synchronization pulse source;

circuit means for coupling said gate means pulse train to said first and second trigger means in controlling relation for limiting operation thereof to changes occurring at the clock pulse rate, whereby the trigger means outputs correspond to the original binary code input information;

and flip-flop circuit means having said trigger means outputs as inputs for producing an output in binary code form equivalent to the original input information.

8. In a method of transmitting information in binary form and audio frequency information on a single carrier, the steps of:

generating a single radio frequency carrier;

varying the phase of the carrier within the range of plus and minus 180° as a function of the binary information, with a positive phase shift corresponding to one binary state and a negative phase shift corresponding to the other binary state;

amplitude modulating the carrier as a function of the audio frequency information;

and radiating the shifted modulated carrier.

9. In a method of transmitting binary information and audio frequency information on a single carrier, the combination of:

generating a single radio frequency carrier;
converting the binary information to a pulse code having a zero average value;
varying the phase of the carrier within the range of plus and minus 180° as a function of the pulse code, with a positive phase shift corresponding to one pulse level and a negative phase shift corresponding to the other pulse level;
amplitude modulating the carrier as a function of the audio frequency information;
and radiating the shifted modulated carrier.

10. In a method of transmitting binary information and audio frequency information on a single carrier, the combination of:
generating a single radio frequency carrier;
converting the binary information to a pulse code having a zero average value with positive and negative going changes at the binary clock rate representing the two binary states respectively, and with intermediate changes having no information content;
varying the phase of the carrier within the range of plus and minus 180° as a function of the pulse code, with a positive shift corresponding to one pulse level and a negative shift corresponding to the other pulse level;
amplitude modulating the carrier as a function of the audio frequency information;
and radiating the shifted modulated carrier.

11. In a method of transmitting binary information and audio frequency information on a single carrier, the steps of:
generating a single radio frequency carrier;
varying the phase of the carrier within the range of plus and minus 180° as a function of the binary information, with a positive phase shift corresponding to one binary state and a negative phase shift corresponding to the other binary state;
amplitude modulating the carrier as a function of the audio frequency information;
radiating the shifted modulated carrier;
receiving the radiated carrier;
and detecting phase shift in the received carrier producing an audio frequency signal corresponding to the binary input information.

12. In a method of transmitting binary information and audio frequency information on a single carrier, the steps of:
generating a single radio frequency carrier;
varying the phase of the carrier within the range of plus and minus 180° as a function of the binary information, with a positive phase shift corresponding to one binary state and a negative phase shift corresponding to the other binary state;
amplitude modulating the carrier as a function of the audio frequency information;
radiating the shifted modulated carrier;
receiving the radiated carrier;
detecting phase shift in the received carrier producing a first audio frequency signal corresponding to the binary input information;
and amplitude demodulating the received carrier producing a second audio frequency signal corresponding to the audio frequency input information.

13. In a method of transmitting binary information and audio frequency information on a single carrier, the combination of:
generating a single radio frequency carrier;
converting the binary information to a pulse code having a zero average value;
varying the phase of the carrier within the range of plus and minus 180° as a function of the pulse code, with a positive phase shift corresponding to one pulse level and a negative phase shift corresponding to the other pulse level;
amplitude modulating the carrier as a function of the audio frequency information;
radiating the shifted modulated carrier;
receiving the radiated carrier;
detecting phase shift in the received carrier producing an audio frequency signal corresponding to the pulse code;
and reconverting the pulse code to the binary input information.

14. In a method of transmitting binary information and audio frequency information on a single carrier, the combination of:
generating a single radio frequency carrier;
converting the binary information to a pulse code having a zero average value with positive and negative going changes at the binary clock rate representing the two binary states respectively, and with intermediate changes having no information content;
varying the phase of the carrier within the range of plus and minus 180° as a function of the pulse code, with a positive shift corresponding to one pulse level and a negative shift corresponding to the other pulse level;
amplitude modulating the carrier as a function of the audio frequency information;
radiating the shifted modulated carrier;
receiving the radiated carrier;
detecting phase shift in the received carrier producing an audio frequency signal corresponding to the pulse code;
generating a synchronization pulse train at the binary clock rate;
and reconverting the pulse code to the binary input information.

References Cited by the Examiner

UNITED STATES PATENTS

| | | | |
|---|---|---|---|
| 2,075,071 | 3/37 | Usselman | 332—17 |
| 2,977,417 | 3/61 | Doelz et al. | 178—51 |
| 2,987,683 | 6/61 | Powers | 332—41 |
| 3,008,124 | 11/61 | Warnock | 343—201 |
| 3,032,745 | 5/62 | Hamer | 178—66 |
| 3,128,342 | 4/64 | Baker | 178—66 |
| 3,128,343 | 4/64 | Baker | 178—66 |

FOREIGN PATENTS

| | | |
|---|---|---|
| 540,185 | 10/41 | Great Britain. |

DAVID G. REDINBAUGH, *Primary Examiner.*